Figure 1:
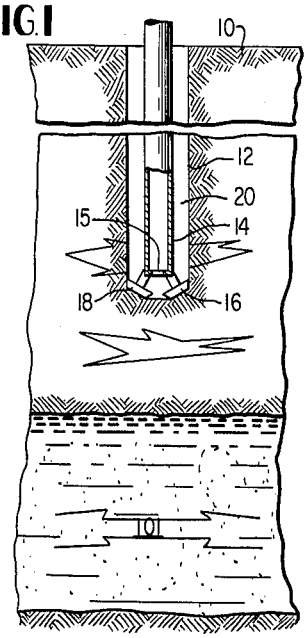

Dec. 14, 1965  L. L. BURGE  3,223,162

POLYMERIZATION METHOD

Filed Aug. 22, 1961

INVENTOR.
LEONARD L. BURGE
BY
Adams, Forward & McLean
ATTORNEYS

United States Patent Office 3,223,162
Patented Dec. 14, 1965

3,223,162
POLYMERIZATION METHOD
Leonard L. Burge, Tulsa, Okla., assignor to Sinclair Research, Inc., a corporation of Delaware
Filed Aug. 22, 1961, Ser. No. 133,098
16 Claims. (Cl. 166—33)

This invention relates to a method for the expeditious polymerization of liquid, resin-forming materials. More particularly, the present invention is concerned with a method employing an inorganic metal salt and sulfur dioxide to copolymerize an aqueous solution of an alkylidene bisacrylamide and an ethylenic monomer.

These resin forming-materials have particular utility in the well treating field, e.g. processes which combat the obstruction of gas circulation when gas-drilling wells through permeable subsurface formations and other processes which partially or completely plug permeable subterranean well areas. Presently, a Redox catalyst system, i.e. an oxidation-reduction catalytic polymerization system, e.g. an ammonium persulfate-sodium persulfate system; is added to the liquid resin-forming material near the well site prior to placing the material in the desired location within the well bore. The components of a catalytic system of this type are generally added in amounts to provide initiation of polymerization of the resin-forming material after a predetermined time, e.g. about 15 to 90 minutes, has elapsed in order to provide sufficient working time for a proper placement of this material in the well bore. This procedure can render control difficult during the crucial moments of polymerization since sometimes the polymerization of the material, causing a change from a mobile liquid to a more or less solid mass, is too slow such that any existing turbulence in the well bore will move the material out of position, e.g. deep into a water formation, and thus critically curtail its sealing effect. On the other hand, if the polymerization is too fast, the resin-forming material may set in the apparatus, e.g. drillpipe, used to manipulate it in the well bore. Furthermore, it has been very difficult, if not impossible, to make any change in the gel time by chemical means after the solution has been injected into the formation. This means that for the most part once the solution is prepared, the gel time is fixed and cannot be shortened nor lengthened in the event of unforseen difficulties.

The present invention is directed to a method providing good control of the copolymerization or gel time of an alkylidene bisacrylamide and an ethylenic monomer. This method is particularly desirable when this material is to be copolymerized in a relatively inaccessible area, e.g. in a well bore hole penetrating a permeable subterranean formation. The desired result is accomplished by placing a resin-forming mixture including an aqueous mixture of the polymerizable monomers, i.e. an alkylidene bisacrylamide and the ethylenic monomer, in position, for instance in the well, and adding catalytic amounts of sulfur dioxide to the mixture in the presence of polymerization expediting amounts of the metal salt to effect polymerization of the polymerizable monomers.

The inorganic metal salts which can be employed in the present invention are the halides of metals of Groups I to III of the periodic table of elements. The halides of halogens having an atomic number from 17 to 35 are preferred. The halides include the alkali and alkaline earth metal halides such as sodium chloride, potassium chloride, magnesium chloride, strontium chloride and calcium chloride as well as their coresponding bromides. Other halides include zinc chloride and aluminum chloride. The halides as specified are not necessarily equivalent from the standpoint of enhancing the polymerization of monomers. Among the halides, calcium chloride and zinc chloride are outstanding in performance, and sodium chloride performs exceptionally well.

The sulfur dioxide can be used either as a gas or in an aqueous solution and is not ordinarily affected by oxidizing and reducing chemicals encountered in field operations, which can radically change polymerization time, and thus has a great advantage over the Redox catalyst systems. The use of sulfur dioxide per se can also provide a more economical and expeditious procedure over the multi-component Redox catalytic system.

The sufur dioxide is provided in the resinous mixture at a pH up to about 9, preferably over about 5 and up to about 7, in catalytic amounts according to the method of the present invention and these amounts will generally range from about 0.01 to 10, preferably from about 0.1 to 6 weight percent, based on the weight of the monomers, i.e. alkylidene bisacrylamide and ethylenic monomer, taking part in the copolymerization. As noted previously, the sulfur dioxide can be added to the mixture as a gas or in an aqueous solution. In addition to sulfur dioxide, sulfur dioxide precursors, e.g. $NaHSO_3$ and $Na_2SO_3$, can also be used. For instance, an aqueous solution of $NaHSO_3$ or $Na_2SO_3$ can be employed to provide the sulfur dioxide in-situ. Concentration of the sulfur dioxide precursors in the aqueous solution can be as desired, for instance 1% or less to saturated solutions. The precursors in dry form can be employed even in a greater concentration since the monomers are generally employed in solution, e.g. aqueous solution; however, there is no apparent advantage in employing the precuror in amounts greater than amounts which will solubilize in the solution.

The liquid resin-forming materials polymerized according to the method of the present invention are particularly siutable for use in the well bore treating field and include an aqueous solution of an alkylidene bisacrylamide and ethylenic comonomer, the bisacrylamide having the formula:

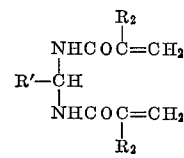

in which

is a hydrocarbon residue of an aldehyde containing, for instance, from about 1 to 10 and preferably from about 1 to 5 carbon atoms, e.g. formalde-, acetalde-, and valeraldehyde; but usually about 1 to 3 carbon atoms; and $R_2$ is a member of the group consisting of hydrogen and a methyl radical.

The other comonomer is a solid, liquid or gaseous ethylenic (i.e. contains at least the $>C=C<$ radical) compound with a solubility of at least about 2% by weight, and preferably at least about 5%, in water and which copolymerizes with the aforesaid bisacrylamide in an aqueous system. Although not essential in practicing the invention, it is preferred to select an ethylenic comonomer which is preferably soluble or at least self-dispersible in water with appropriate stirring, as such, for example, methylenebisacrylamide, which is capable of polymerizing.

In addition to the comonomer N,N'-methylenebisacrylamide set out in the examples hereinafter, any of the alkylidene bisacrylamides corresponding to the above formula which are described and claimed in Lundberg Patent No. 2,475,846 hereby incorporated by reference, or mixtures thereof may be used as cross-linking agents.

Only slight solubility is required of the alkylidene bisacrylamide in view of the small amount used; therefore, this component may have a water solubility as low as about 0.02% by weight at 20° C. but a solubility of at least about 0.10% is more desirable for general purposes.

A wide variety of ethylenic comonomers or mixtures thereof are copolymerizable with the alkylidene bisacrylamides; those having a formula containing at least one >C=C< group, preferably containing from about 1 to 8 carbon atoms, hereinafter referred to as the ethenoid group, and having appreciable solubility in water are suitable for use in the present invention. See U.S. Patent No. 2,801,985, hereby incorporated by reference. As set forth in this patent the unsubstituted bonds in the ethenoid group may be attached to one or more of many different atoms or radicals including hydrogen, halogens, such as chlorine and bromine, cyano, aryl, aralkyl, alkyl, and alkylene with or without solubilizing groups attached to these hydrocarbons. In addition, the substituents on the ethenoid group may comprise one or more hydrophilic groups including formyl, methylol, polyoxyalkylene residues and quaternary ammonium salt radicals,

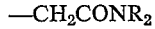

—OOCH; —OOCCH$_3$; —SO$_3$X, where X is H, NH$_4$, an alkali metal or an alkylamine; —CONR$_2$ and

—CH$_2$CONR$_2$ where each R is hydrogen, alkylol, lower alkyl or a polyoxyalkylene radical; and —COOR' and —CH$_2$COOR', where R' is a H, NH$_4$ alkali metal, alkaline earth metal, organic nitrogenous base, alkylol, lower alkyl or polyoxyalkylene radical. The large number of combinations and proportions of the various suitable substituents makes it impractical to list all compounds in this category which may be employed. The water solubility of these substances is known to depend chiefly on the number and type of hydrophilic and hydrophobic radicals therein; for example, the solubility of compounds containing an alkyl radical diminishes as the length of the alkyl chain increases and aryl groups tend to decrease water solubility, whereas the aforesaid hydrophilic substituents all tend to improve the solubility of a given compound in water. Accordingly, the comonomer should be selected according to chemical practice from those containing sufficient hydrophilic radicals to balance any hydrophobic groups present in order to obtain the requisite water solubility of monomer.

Among the water-soluble ethenoid monomers, those containing an acrylyl or methacrylyl group are especially recommended. These are exemplified by N-methylol acrylamide, calcium acrylate, methacrylamide and acrylamide. Other suitable ethenoid compounds are acrylic acid; other N-substituted acrylamides, such as N-methylacrylamide, N - 3 - hydroxy-propylacrylamide, dimethylaminopropylacrylamide, N - ethylol acrylamide; acrylonitrile; saturated alkyl esters of acrylic acid, i.e. methyl acrylate, β-hydroxyethyl acrylate; ethylene glycol and polyethylene glycol acrylates, an example being the reaction product of β-hydroxyethyl-acrylate or acrylic acid with about 1 to about 50 mols or more of ethylene oxide; salts of acrylic acid, i.e. magnesium acrylate, sodium acrylate, ammonium acrylate, zinc acrylate, β-amino-ethylacrylate, β-methylaminoethylacrylate, guanidine acrylate and other organic nitrogenous base salts, such as diethylamine acrylate and ethanolamine acrylate; quaternary salts like alkyl acrylamidopropyl dimethylamino chloride; acrolein, β-carboxyacrolein, butenoic acid; α-chloroacrylic acid; β-chloroacrylic acid; as well as methacrylic acid and its corresponding derivatives.

Maleic acid and its corresponding derivatives including partial esters, partial salts, and ester salts thereof; maleamic, chloromaleic, fumaric, itaconic, citraconic, vinyl sulfonic, and vinyl phosphonic acids and their corresponding derivatives and mixtures thereof. Derivatives of this kind and other suitable compounds include α,β-dichloroacrylonitrile, methacrolein, potassium methacrylate, magnesium methacrylate, hydroxy ethyl methacrylate, zinc β-chloroacrylate, trimethylamine methacrylate, calcium α-chloromethacrylate, diethyl methylene succinate, methylene succindiamide, monomethyl maleate, maleic diamide, methylene maloanamide, diethyl methylene malonate, methyl isopropenyl ketone, ethyl vinyl ketone, propyl vinyl ketone, vinyl formate, vinyl lactate, vinyl acetate, vinyl bromoacetate, vinyl chloroacetate, vinyl pyrrolidone, allyl levulinate, allyl alcohol, methallyl alcohol, diallyl carbonate, allyl lactate, allyl gluconate, di(β-aminoethyl) maleate, di(methylaminoethyl) maleate, di(N,N'-dimethyl-β-aminoethyl) maleate, sulfonated styrene, vinyl pyridine, maleic anhydride sodium maleate, ammonium maleate, calcium maleate, monopotassium maleate, monoammonium maleate, monomagnesium maleate, methyl vinyl ether, N-aminoethyl maleamide, N-aminoethyl maleimide, alkyl aminoalkyl maleamides, N-vinyl amines, N-allyl amines, heterocyclic ethenoid compounds containing nitrogen in a tertiary amino group, and the amine and ammonium are salts of said cyclic compounds, N-vinyl acetamide, N-vinyl-N-methyl formamide, N-vinyl-N-methyl acetamide, N-vinyl succinimide, N-vinyl diformamide, N-vinyl diacetamide, vinyl sulfonyl chloride, vinyl sulfonic acid salts, vinyl sulfonic acid amides, vinyl oxazolidone, allyl amine, diallylamine, vinyl methyl pyridinium chloride, and allyl trimethyl ammonium chloride to name only a few of the operative compounds.

The preferred resin-forming composition employed in the method of the present invention is in an aqueous medium and has an initial viscosity approximating that of water. These compositions can be formed by dissolving a mixture of acrylamide and N,N'-methylenebisacrylamide in fresh water. Generally, this mixture contains about 1 to 25 weight percent of N,N'-methylenebisacrylamide and about 99 to 75 weight percent of ethylenic monomer, e.g. acrylamide. The aqueous solution will usually include from about 5 weight percent of this mixture to its limit of solubility and preferably this amount is about 5 to 25%. Although the acrylamide as such is preferred, its nitrogen atom could be substituted as with a hydroxy methyl, a hydroxy ethyl or other group.

The inorganic metal salt, e.g. alkaline earth metal halide, is employed in polymerization expediting amounts and is usually incorporated in the resin-forming mixture. The polymerization expediting amounts are those amounts which will enhance the polymerization rate of the monomers included in the resin-forming mixture and will generally range from about 5 to 35 or more weight percent based upon the aqueous resin-forming mixture and salt. For instance, calcium chloride can be used in various amounts such as about 5 weight percent of the aqueous resin-forming mixture and calcium chloride, or in amounts up to its solubility, to provide advantageous electrical conductivity characteristics, preferably a conductivity between that of fresh H$_2$O and brine when used in well treating operations, to enable detection of the resin-forming material in the well bore. When large amounts are present conductivity is greater than that of salt water and permits detection when the resin-forming material is located below a salt water layer. Calcium chloride can also be present in amounts ranging from about 15 to 35 or more weight percent based on the aqueous resin-forming mixture and calcium chloride, for instance up to the limit of solubility, to provide advantageous weighted or specific gravity characteristics such that the resin-forming material can be efficiently displaced into the permeable area before it can be dispersed by physical contact with salt or fresh water present in the well bore, i.e. the resin-forming material is made heavier than the salt or fresh water and is resistant to dispersion.

Aquagel (a gel-forming, colloidal bentonite clay used in oil well-drilling fluids to produce colloidal muds) or a mixture of Aquagel and Baroid (pulverized barytes, $BaSO_4$, a mud weighting agent for increasing the unit weight of the mud) can also be incorporated to produce a tougher gel than that which results when no solids are added. This would be particularly advantageous when the resin-forming material is used to combat lost circulation in drilling wells when mud is used as the circulation medium.

It may be desirable to exercise care as to the amount of additives incorporated into the resin-forming material and this will depend upon the specific additive employed. In general, the initial viscosity of the material at the temperatures and pressures encountered in the bore hole is such that it has a viscosity of up to about 10 to 15 centipoises, advantageously about 1 to 5 centipoises at these conditions.

The present invention can be used in a method employed in plugging a permeable well location, for instance in a method described in copending application Serial No. 642,867, filed February 27, 1957, now Patent No. 3,044,548, hereby incorporated by reference. In this method the area to be plugged is first located as to its vertical position in the well bore. This area is spaced away from the bottom of the bore and generally will be between two adjacent areas of lesser permeability although this is not an absolute necessity. Salt (NaCl) water or brine is then provided in the well bore in an amount sufficient to reach the approximate location of the area to be plugged. The level of the salt water can be at or slightly below or above the plugging area but it should not be vertically displaced a distance from the area such that substantial plugging occurs in locations where it is not desired. The salt water can be added as such to the well, or fresh water can be injected which after remaining a sufficient period in the bore will become salty due to the presence of salt in the earth's strata. After the proper level of salt water is established the organic resin-forming material is positioned on this medium. Preferably, the salt water layer is below a fresh water layer with these materials forming an interface in the approximate location of the permeable area, and in this case the resin-forming material is positioned on the salt water layer and thus in the interface between these layers. The resin-forming material is then displaced into the adjacent well area or stratum as by natural flow or by a separately applied gaseous or liquid pressure to one or both of the water layers and allowed to remain in the area to set up or harden to provide a partial or complete plug resistant to the flow of fluids, particularly liquids. Unless the material is light enough to remain upon the surface of the salt water which has a specific gravity greater than 1, generally at least about 1.2, it must be quickly displaced into the permeable area before it can disperse into the lower salt water phase or an overlying fresh water layer, if any be present. To reduce the chances of this happening, resin-forming materials having specific gravities of up to about 1.18, preferably up to about 1.13, can be used with advantage. Also, as it may be advantageous to locate the resin-forming material between the salt water layer and an overlying fresh water column, the resin-forming material can preferably have a specific gravity of at least about 1.07, more desirably at least about 1.11. The specific gravity of the resin-forming material can be adjusted by the addition of weighting agents. Suitable weighting agents include water-soluble, non-ionizing organic compounds, e.g. calcium chloride, sugar and glycerol.

The permeable area to be plugged can be located by conventional procedures, e.g. the use of liquid-to-liquid interfaces between two dissimilar liquids such as water and oil, fresh and salt water, and radioactive and nonradioactive liquids, e.g. see U.S. Patents Nos. 2,376,878 and 2,413,435 to Pfister, R. J. Trans. A.I.M.E., vol. 174, page 269 (1948), to determine the injectivity profile or liquid injection characteristics of the well or sand face.

By following the present invention in the above embodiment, the resin-forming material containing inorganic metal salt is displaced into the permeable area, the sulfur dioxide can be conducted into the well bore, the resin-forming material, in this instance an aqueous solution of alkylidene bisacrylamide and an ethylenic monomer containing $CaCl_2$ receives the sulfur dioxide which is dispersed in the resin-forming material and polymerization is effected. The material polymerizes to a solid and thus seals the permeable formation.

The detection means employed for tracking the position of the resin-forming material in the well bore in this method can vary. In one method for instance, in the above procedure using a salt water layer as a platform, the characteristics of the resin-forming material can be such that it is detectable by an electrical conductivity profiling unit when the material is placed on the salt water layer. Thus, if the salt water layer is essentially characterized by a certain conductivity and the resin-forming composition is essentially characterized by a significantly different conductivity, the conductivity profiling unit will indicate the degrees of current flow within the resin-forming composition and salt water. Accordingly, when the conductivity circuit is the same or similar to the conductivity characteristics of the salt water, the instrument is in the salt water and when the conductivity circuit is the same or similar to the conductivity characteristics of the resin-forming material, the instrument is in the resin-forming material. Thus by raising and lowering the instrument the interface in between the resin-forming material and the salt water layer can be located and by checking the depth of the detection instrument the location of the resin-forming material is known.

A device suitable for use in measuring the electrical conductivity of the fluids in the well bore is described in U.S. Patent No. 2,776,563. This device, known as a magnetic coupler, includes a magnetic core, and two electrically conducting coils essentially composed in two basic combinations. One of the combinations, conveniently referred to as a magnetic coupler sub, is essentially comprised of one of the coils, the first coil, surrounding the magnetic core and fixedly mounted within a structure. The other combination, conveniently referred to as the stinger, comprises a cable containing an insulated electrical conductor communicating with the other coil which is contained within a structure adapted to removably surround the first coil. Under operational conditions the magnetic coupler sub may be installed in a position just above the materials e.g. resin forming and salt water, located in a well. Accordingly, when the position of a liquid of known electrical conductivity within the well bore is desired, the stinger is lowered into the well and joined to the magnetic coupler sub, the sub is maneuvered until the liquid or the interface between liquids is located, and by noting the depth of the stinger, the position of the liquid or the interface between two liquids is known. Additionally, if a two-conductor cable is employed in the stinger arrangement, the stinger itself can be used as an integral detection unit.

The present invention can also be used in a method for combatting the effect of a reduction or a cessation of the air circulation in air-drilling methods when drilling through permeable areas from which gas, liquid or loosely consolidated strata enters the well bore being drilled. The desired result is accomplished by selectively and substantially completely sealing formations of this character from the well bore in an expeditious and economical manner so as to maintain the advantages of the air-drilling procedures over the conventional procedures which use mud as the circulating medium.

According to this method, when an obstruction of air circulation, i.e. a reduction or cessation thereof, is experienced during an air-drilling operation and the obstruction is attributed to the ingress of gas, liquid or loosely consolidated earth particles into the bore from an adjacent stratum, the resin-forming material is introduced into a string of tubing extending downwardly below the permeable formation. The resinous material, which is generally weighted, e.g. with CaCl₂ to be heavier than salt water, is conducted downwardly in the tubing. A first portion of the resinous material is conducted through the lower extremity of the tubing and forms a column in the annular space between the tubing and the wall of the well bore which column at least covers the formation to be sealed. The level of this annular column is maintained, for instance by extraneous pressure means, while the upper level of the remaining or secondary portion of the resinous material in the tubing is pressured to force permeable formation sealing amounts of resinous material into the permeable formation. The resinous material is maintained in this position until it substantially solidifies. The solid resin is drilled through and drilling is continued with gas circulation to remove cuttings from the well.

This material is of the type that will harden at temperatures encountered in the well bore, which in many cases are between about 50 to 200° F. The quantity of resin-forming material used is preferably adequate to extend horizontally into the formation of ingress for a distance sufficient to securely seal this formation subsequent to the hardening of the resinous material to prevent further ingress of unwanted extraneous materials. This distance usually extends at least about six inches into the formation. Moreover, in this method it is preferred that the resin-forming composition occupy the well bore adjacent the formation of ingress when the hardened resin is formed. Accordingly, after the introduction of the resin-forming composition, which has a specific gravity higher than the ingressing well fluid, into the well bore, detection means are employed to track the upper level of the resin-forming composition, and gas or liquid, e.g. air or water pressure is applied to bring this upper level approximately adjacent the upper level of the strata of ingress, and the resinous composition is maintained in this position until it solidifies. Although air, other gas or liquid pressure can be employed in our method, air is preferable since (a) it permits better control of the resin-forming material and (b) the well bore is drier following the polymerization of the resin-forming composition and no time must be spent drying the hole before drilling. The gas pressure will depend upon the nature of the obstruction encountered and the depth of the permeable formation; it is generally greater than about 150 p.s.i but is usually about 150 to 1000 p.s.i. Since tremendous pressures can be required, it may be desirable to produce such pressures by employing liquid and gas in combination, e.g. provide a liquid column above the resin-forming composition and exert air pressure on the liquid column. Following solidification of the resinous composition, air-drilling is resumed.

As an example, the present invention can be incorporated in this gas-drilling method after the resin-forming material containing CaCl₂ is in place or as the material leaves the drill pipe. In the latter case, the sulfur dioxide, for instance in a liquid form, can be lowered into the well bore hole inside the drill pipe to a point of contact with the resin-forming material wherein the catalyst is added to the resin-forming material as the material leaves the drill pipe to effect polymerization of the material. Alternatively, gaseous SO₂ can be conducted alone or in a carrier gas such as nitrogen or natural gas, to the resin-forming material after the material has been placed in the permeable area.

The method of the present invention can also be used in another method for combatting the effect of a reduction or a cessation of the air circulation in air-drilling methods in which the resin-forming material is of a specific gravity lighter than salt water and described in copending application Serial No. 686,198, filed September 25, 1957 and now Patent No. 3,011,547. It can also be used in another method which is set forth in Example I.

The following specific examples will serve to illustrate this invention but are not to be considered limiting.

*Example I*

The method of this invention as used in an air-drilling method can best be described with reference to a specific example and the drawing. FIGURES 1 through 6 set forth several distinct phases of the method.

Referring to the drawing, FIGURE 1, the numeral 10 represents the earth's surface through which a well bore 12 is being drilled to an oil-producing formation with rotary drill pipe 14 containing a rotary bit 16 at the lower end. Pressurized air is introduced into drill pipe 14 at the surface of the earth, is conducted downwardly therein, exits through opening 15 of rotary drill bit 16 at the site or formation of drilling 18, and passes upwardly through annulus 20, surrounding drill pipe 14, carrying relatively small as well as larger rock particles from the site of drilling to the earth's surface.

Figure 2:
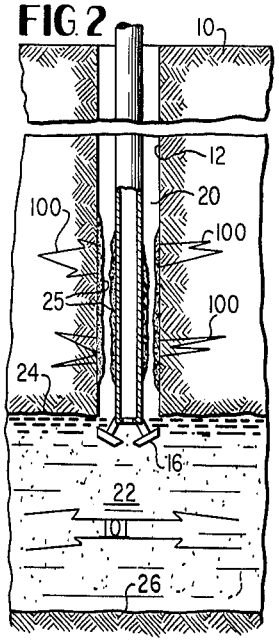
Figure 3:
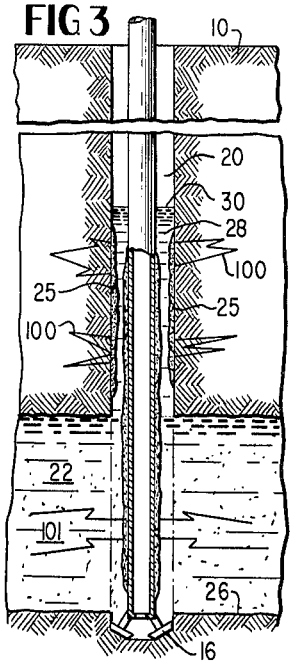

In FIGURE 2 rotary drill bit 16 passes through crevices 100, and penetrates a salt water formation 22 at its upper level 24 as indicated by a reduction in air circulation as well as the muddy nature of the particles recovered from the site of drilling. Water cuttings 25 stick to the well bore and drill pipe. The depth of the drill bit is noted and thus the position of upper level 24 of salt water formation 22 is known. In FIGURE 3 drilling is continued through the salt water-bearing formation containing crevice 101, air circulation eventually ceases due to the accumulation of water cuttings 25 in the annulus and the back pressure of the salt water, a column of salt water 28 rises in the well bore to level 30 in annulus 20, the lower level 26 of salt water formation 22 is penetrated by rotary drill bit 16 and drilling is discontinued. Occasionally, in cases where the water formation is of considerable depth, it may not be possible to penetrate the lower level of the formation before water production stops further drilling.

Figure 4:
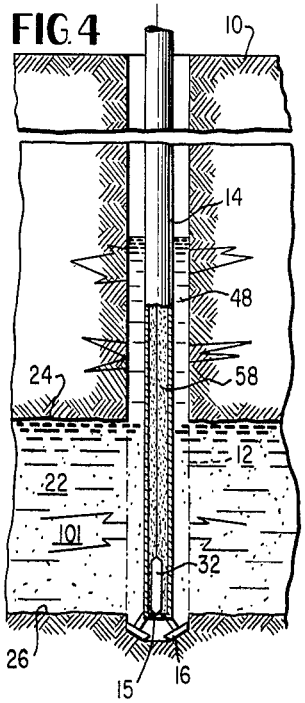

In FIGURE 4 capsule 32 containing as an SO₂ precursor, NaHSO₃, is placed in position near opening 15 in drill pipe 14. The capsule contains 100 cc. of 40% NaHSO₃. An amount of resinous material 58 at least sufficient to cover the portions of formation 22, about a 30-foot section, exposed to well bore 12, for instance a total of about 300 gallons of resinous material, weighted, e.g. with 30% CaCl₂, to be heavier than the salt water in the well bore, consisting essentially of 10 parts by weight of a mixture of 5% N,N'-methylene-bisacrylamide and 95% acrylamide, 30 parts of CaCl₂ and 60 parts water, is injected down drill pipe 14 at a rate of 10 gallons per minute, is catalyzed by triggering solution released by capsule 32 in an amount of 10 cc./gal. of resin-forming material passing through opening 15 and into the formation.

Figure 5:
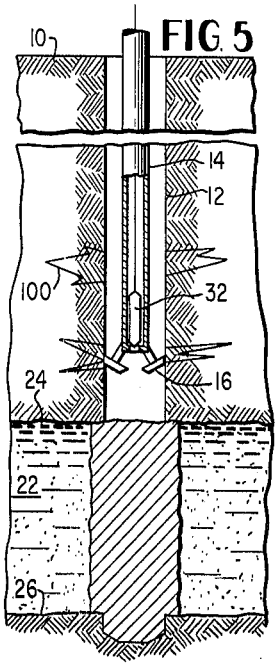

As the catalyzed resinous material is pumped through opening 15 and into the annulus formed between the drill pipe and the well bore walls, the drill pipe is raised at a rate of one foot per minute to the position shown in FIGURE 5. In this operation the pressure of the pumped resinous material is sufficient to force a significant quantity into the adjacent formation as the drill pipe is raised. The resinous material displaces salt water in the formation and sets in 3 to 5 seconds. In FIGURE 5 the drill pipe and bit are in the lifted position as shown and the resinous material has set.

Figure 6:
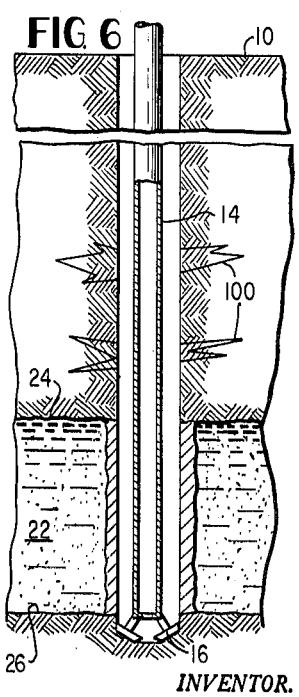

In FIGURE 6, following the solidification of the resinous material, the salt water is blown out, air circulation down drill pipe 14 to rotary drill bit 16 is initiated, drilling is resumed, the solidified resinous material is drilled through, and the drilling continues downwardly into the earth's surface while removing cuttings from the well bore by air circulation down the drill pipe and up the well annulus.

Example II

The following example illustrates a method, using the liquid resin-forming materials and polymerization technique described above, to plug a permeable subterranean well area.

A specific example of the method can be illustrated by reference to a field operation which is not to be considered limiting either procedurally or with respect to the composition of the resin-forming material. In this operation the well is a water flood injection well having cement tubing and a shot bore hole. An injection profile is obtained by the constant interface method using fresh and salt water and the well is found to be fractured at about 814.5′ from ground level. The total injection rate of the well is about one gallon per minute of fresh water at a well head pressure of 230 p.s.i.g. Twenty gallons of resin-forming material, including:

| | Wt. percent |
|---|---|
| $CaCl_2$ | 5 |
| Acrylamide | 19 |
| N,N′-methylene-bisacrylamide | 1 |
| Water | Balance | and with the following properties at about 75° F.:

| | |
|---|---|
| Viscosity | 1.3 centipoises. |
| Specific gravity | 1.12. |
| Electrical conductivity | ~250 milliamps at 6 volts. | are placed in a salt-fresh water interface at 814.5′ while injecting into the resin-forming material, 20 (e.g. 15 to 25) cc. of trigger/gal. of material at 230# well head pressure. The trigger solution is comprised of 40% by weight of $NaHSO_3$. Immediately upon the placing of the resin-forming material in the interface the profiling unit detects it at a position slightly above and below 814.5′, the location of the fracture. However, as the permeability of the well at locations other than the fracture is relatively low, the resin-forming material is displaced by squeezing into the adjacent area through the fracture by starting the fresh water and brine flows at the rate of 0.5 gallon per minute. The controlled flow of fresh water and brine is also used as means for maintaining the interface at the fracture.

Example III

The data presented in the following tests establish the amount of sulfur dioxide that can be used, noting that a fairly rapid polymerization time may be required in order to apply the technique of shutting off water zones encountered in air drilling.

The amount of calcium chloride was varied from 1 to 30% by weight based on the weight of the $CaCl_2$, AM-9 and water, and the amount of AM-9 (a mixture of 95% acrylamide and 5% N,N′-methylene-bisacrylamide) was tested at two concentrations, 10 and 20%, in a water solution. The sulfur dioxide, the trigger chemical, was added as an aqueous solution of sodium hydrogen sulfite ($NaHSO_3$), in concentration strengths from 5 to 39.5% (saturated solution), and as a gas. All tests were run at room temperature, 80° F.

All solutions are made on a weight per volume basis. Thus a 5% $NaHSO_3$ solution is 5 gms. of $NaHSO_3$ diluted to 100 ml. One ml. contains .05 gm. of $NaHSO_3$ or .0293 gm. of $SO_2$. The $NaHSO_3$ contains 58.5% $SO_2$.

In each test the solution of AM-9 was agitated with an air driven stirrer adjusted so that a vortex was formed that did not draw air into the solution. The trigger chemical was added by means of a calibrated pipette and the time interval from the addition of the chemical to the change in position of the vortex measured. As the polymerization took place the liquid tended to climb the stirrer and this served as a shut-off point for the timed interval.

The following data from tests demonstrate the substantial polymerization expediting effect of using an inorganic salt, e.g. $CaCl_2$, in amounts generally ranging from about 5 to 35 or more percent with $SO_2$ or an $SO_2$ precursor to polymerize AM-9 resin-forming material. The tests were run using a 39.5% $NaHSO_3$ solution as the triggering chemical at 80° F.

| Composition | A | B | C | D | E | F | G | H | I |
|---|---|---|---|---|---|---|---|---|---|
| Amount of AM-9, Wt. Percent | 10 | 10 | 10 | 10 | 10 | 10 | 10 | 10 | 20 |
| Wt. Percent of $SO_2$/monomers | .571 | .571 | 2.88 | 2.88 | .571 | 2.88 | 1.72 | 5.71 | .288 |
| pH of resin-forming material | 7 | 5.5 | 7 | 5.5 | 5.5 | 5.5 | 7.0 | 7.0 | 7.0 |
| Amount of $CaCl_2$, Wt. Percent | 30 | 1 | 30 | 1 | 10 | 10 | 30 | 30 | 30 |
| Results: | | | | | | | | | |
| Setting time | 3.4 sec. | 14 min. | 11.5 sec. | 40 min. | 1 min. | 70 min. | 4 min. | 15–30 sec. | 11 sec. |
| pH of polymerized resin | 6.0 | 5.2 | -------- | 5.0 | 5.5 | 4.5 | 6.8 | -------- | 6.6 |

A comparison, for instance, between the results of Compositions A and C with B and D, respectively, as well as E with B, show the polymerization expediting effect of using the inorganic salt in the amounts employed within the range of 5 to 35%. The results for composition F show the advantage of maintaining a pH greater than about 5 to expedite polymerization or set time. Compositions G and H show the use of various amounts of $SO_2$ and Composition I shows the use of 20% AM-9.

Example IV 400 mls. of a solution containing 10% AM-9 and 30% $CaCl_2$ was triggered with $SO_2$ gas. 20 mls. of $SO_2$ gas was added, by means of a hypodermic syringe at such a rate that virtually all the $SO_2$ went into solution. This amount of $SO_2$ was equivalent to 0.2 ml. of 39.5% $NaHSO_3$ solution (.115% $SO_2$/monomers). The plastic set in 35 seconds.

Example V

A resin-forming solution, 400 mls. in size and containing 10% AM-9 and 30% $CaCl_2$ was triggered with 1.0 ml. of a 27.45% solution of $Na_2SO_3$. The $Na_2SO_3$ contains ~50.8% $SO_2$. The solution set in 5 minutes and 47 seconds.

Examples VI and VII

The data presented in the following examples show the use of a resin-forming material containing Ayuagel mud and an Aquagel mud mixed with Baroid mud weighting agent in the method of the present invention.

Two muds were prepared; a straight Aquagel mud and an Aquagel mud with Baroid mud weighting agent. In both cases, a solution of 10% AM-9 plus 30% calcium chloride was used as the water component of the mud. A one liter batch of each of these muds was then triggered with 2.5 ml. of 39.5% sodium bisulfite to determine the effect on the setting time.

Results were as follows:

| Mixture Used | Setting Time, sec. | Weight lbs./gal. |
|---|---|---|
| 10% AM-9 + 30% $CaCl_2$ | 3.5 | 9 |
| 750 ml. of 10% AM-9 + 30% $CaCl_2$; 250 gms. Aquagel | 10 | 10.9 |
| 750 ml. 10% AM-9 + 30% $CaCl_2$; 250 gms. Aquagel; 500 gms. Baroid weighting agent | 10 | 13.6 |

The resultant gel with mud solids present is somewhat tougher than that resulting when no solids are added.

These results indicate that only a very slight inhibiting effect results when Aquagel or Aquagel and Baroid mud weighting agent are added to a 10% AM–9 plus 30% calcium chloride solution and the resulting mixture triggered with sodium bisulfite solution. The effect percentage wise is considerable but the actual time interval is so small that in practice it would probably be negligible. A check of the actual mud solids in the quantities in which they would be used in the well should be made as a precaution.

*Examples VIII to XIV*

The following examples show the use of a variety of halides which can be employed in the present invention and the results of tests conducted with each.

For comparison with previous results, all tests were made with a solution containing 10% AM–9 and 30% of the particular salt. All tests were conducted at a room temperature of 75° F. Four hundred milliliters of the solution were triggered with one milliliter of 39.5% sodium bisulfite while being stirred vigorously with an air stirrer. Stirring was continued for one minute unless setting occurred before this time.

Results of tests were as follows:

| Example | Salt Used | Setting Time |
| --- | --- | --- |
| VIII | NaCl (sat'd. sol'n.—30% not sol.) | 40 sec. |
| IX | MgCl$_2$.6H$_2$O | 5 min. |
| X | SrCl$_2$ | 10 min. |
| XI | ZnCl$_2$ | 16.2 sec. |
| XII | AlCl$_3$ | 3 min. |
| XIII | KCl (sat'd. sol'n.—30% not sol.) | 9 min. |
| XIV | CaCl$_2$ | 3.5 sec. |
|  | None (control) | 25 min. |

It is claimed:

1. A method for expeditiously copolymerizing an aqueous solution consisting essentially of a mixture of (a) about 1 to 25 weight percent of a monomeric alkylidene bisacrylamide of the formula

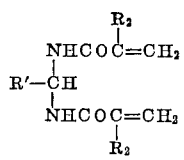

in which

is a hydrocarbon residue of an aldehyde containing from 1 to 10 carbon atoms and R$_2$ is of the group consisting of hydrogen and methyl, and (b) about 75 to 99 weight percent of another ethylenic monomer copolymerizable with (a), the step comprising contacting the mixture with a catalyst consisting essentially of catalytic amounts of sulfur dioxide in the presence of polymerization expediting amounts sufficient to enhance the polymerization rate of the said monomers of a Group I to III metal halide to obtain copolymerization to a solid material.

2. The method of claim 1 wherein the bisacrylamide is N,N'-methylene-bisacrylamide.

3. The method of claim 2 wherein the ethylenic monomer is acrylamide.

4. The method of claim 3 wherein the mixture is contacted with sulfur dioxide in amounts of about 0.01 to 10 weight percent based on said mixture and wherein the halide is present in amounts of about 5 to 35 percent based on the total weight.

5. The method of claim 3 wherein the halide is calcium chloride.

6. The method of claim 5 wherein the mixture is contacted with sulfur dioxide in amounts of about 0.1 to 6 weight percent based on said mixture and wherein calcium chloride is present in amounts of about 15 to 35 weight percent.

7. A method for decreasing the permeability of a permeable area in a well, the steps comprising introducing an aqueous solution containing a mixture of (a) about 1 to 25 weight percent of a monomeric alkylidene bisacrylamide of the formula

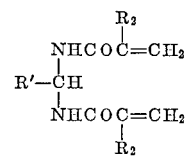

in which

is a hydrocarbon residue of an aldehyde containing from about 1 to 10 carbon atoms and R$_2$ is of the group consisting of hydrogen and methyl, and (b) about 75 to 99 weight percent of another ethylenic monomer copolymerizable with (a) into a permeable area, contacting the aqueous mixture with a catalyst consisting essentially of a catalytic amount of sulfur dioxide in the presence of polymerization expediting amounts sufficient to enhance the polymerization rate of the said monomers of a Group I to III metal halide to solidify the aqueous mixture therein and decrease the permeability of the well area.

8. The method of claim 7 wherein the bisacrylamide is N,N'-methylene-bisacrylamide.

9. The method of claim 8 wherein the ethylenic monomer is acrylamide.

10. The method of claim 9 wherein the aqueous mixture is contacted with sulfur dioxide in amounts of about 0.01 to 10 weight percent based on said aqueous mixture and wherein the halide is present in amounts of about 5 to 35 weight percent based on the total weight.

11. The method of claim 9 wherein the halide is calcium chloride.

12. The method of claim 11 wherein the aqueous mixture is contacted with sulfur dioxide in amounts of about 0.1 to 6 weight percent based on said aqueous mixture and wherein calcium chloride is present in amounts of about 15 to 35 weight percent.

13. A method for combatting the obstruction of gas circulation in drilling wells employing gas as the circulation medium wherein the obstruction results from the ingress of extraneous materials into the well bore, the steps comprising introducing an aqueous solution containing a resin-forming material consisting essentially of a mixture of (a) about 1 to 25 weight percent of a monomeric alkylidene bisacrylamide of the formula

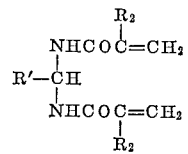

in which

is a hydrocarbon residue of an aldehyde containing from about 1 to 10 carbon atoms and R$_2$ is of the group consisting of hydrogen and methyl, and (b) about 75 to 99 weight percent of another ethylenic monomer copolymerizable with (a), into a string of tubing extending downwardly in the well bore below the upper level of the formation of ingress, conducting the resin-forming material through the tubing, contacting the resin-forming material as it leaves the tubing with a catalyst consisting essentially of a catalytic amount of sulfur dioxide in the presence of polymerization expediting amounts sufficient to enhance the polymerization rate of said monomers of Group I to III metal halide, introducing a formation sealing amount of the resin-forming material from the tubing into the portion of the formation of ingress exposed in the well bore to solidify the resin-forming material therein and to seal the formation of ingress, drilling through the solidified resin, and continuing drilling with gas circulation to remove cuttings from the well.

14. The method of claim 13 wherein the resin-forming material is contacted with sulfur dioxide in amounts of about 0.01 to 10 weight percent of said resin-forming material and wherein the halide is present in amounts of about 5 to 35 weight percent based on the total weight.

15. A method for selectively decreasing the permeability of a well area, the steps comprising locating adjacent the well bore a permeable area to be plugged which is spaced upwardly from the bottom of the well bore, providing a salt water layer in the lower portion of the well bore to the approximate location of the permeable area, positioning on said salt water layer an aqueous solution containing an organic resin-forming composition consisting essentially of a mixture of (a) about 1 to 25 weight percent of a monomeric alkylidene bisacrylamide of the formula

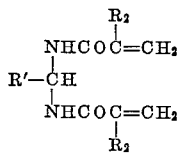

in which

is a hydrocarbon residue of an aldehyde and $R_2$ is of the group consisting of hydrogen and methyl, (b) about 75 to 99 weight percent of another ethylenic monomer copolymerizable with (a), said composition having a viscosity of up to about 15 centipoises, moving the resin-forming composition into the adjacent permeable area while the viscosity is up to about 15 centipoises, contacting the composition with a catalyst consisting essentially of a catalytic amount of sulfur dioxide in the presence of polymerization expediting amounts sufficient to enhance the polymerization rate of said monomers of Group I to III metal halide to solidify the resin-forming composition and decrease the permeability of the area.

16. The method of claim 15 wherein the resin-forming composition is contacted with sulfur dioxide in amounts of about 0.01 to 10 weight percent of said resin-forming composition and wherein the halide is present in amounts of about 5 to 35 weight percent based on the total weight.

References Cited by the Examiner
UNITED STATES PATENTS

| | | | |
|---|---|---|---|
| 2,356,925 | 8/1944 | Fryling | 260—86.3 |
| 2,801,984 | 8/1957 | Morgan et al. | 166—33 |
| 2,940,729 | 6/1960 | Rakowitz | 166—33 |
| 3,011,547 | 12/1961 | Holbert et al. | 166—33 |
| 3,056,757 | 10/1962 | Rakowitz | 166—33 |

CHARLES E. O'CONNELL, *Primary Examiner.*

NORMAN YUDKOFF, BENJAMIN HERSH,
*Examiners.*